United States Patent Office 2,791,614
Patented May 7, 1957

2,791,614

PRODUCTION OF ACETALDEHYDE FROM ACETYLENE

Mamoru Ban, Nakatsu, Naruocho, Nishinomiya, and Fumiko Ida, Takaishicho, Senbokugun, Japan, assignors, by direct and mesne assignments, of one-half to Taoka Dyestuff Manufacturing Company, Limited, Osaka City, and one-half to Sahei Taoka, Ikeda City, Osaka Prefecture, Japan No Drawing. Application October 15, 1954, Serial No. 462,603

Claims priority, application Japan October 27, 1953

4 Claims. (Cl. 260—605)

This invention relates to the production of acetaldehyde from acetylene. It particularly relates to the method of producing acetaldehyde from acetylene by hydration in the liquid phase in presence of a zinc or cadmium salt.

In our invention, acetylene at a pressure of more than 10 atmospheres is reacted with water at a temperature above 100° C. in an acidic aqueous solution of a salt of zinc or cadmium in a concentration of less than 50 percent.

An acidic aqueous solution of a zinc or cadmium salt is obtained by dissolving a salt of a strong acid selected from the group consisting of halide, sulfate and sulphonate, or adding an inorganic or organic acid to an aqueous solution of a salt of a weak acid such as the acetate and naphthenate. Known salts of strong acid are halide, sulfate, sulphonate, phosphate and nitrate, but for the process in question, halide, sulfate and sulphonate are preferably employed, on account of the low solubility of phosphate and the side reaction shown by nitrate. In our invention, an aqueous solution is used in the concentration of less than 50 percent and especially, in the case of halide, a concentrated aqueous solution such as constitutes a so-called ansolvo acid should not be used.

Heretofore the production of acetaldehyde from acetylene has generally been carried out industrially in the liquid phase in presence of an aqueous solution of a mercury salt as catalyser, by passing in acetylene gas at atmospheric or substantially atmospheric pressure. Salts other than mercury salts have been intensively studied but they result generally in a smaller yield of acetaldehyde, lower reaction velocity or more impure product. According to United States Patent No. 2,077,586 an aqueous catalyst solution essentially containing at least one water-soluble halide of a heavy metal selected from the group consisting of zinc chloride, chromium chloride, ferric chloride and cadmium chloride in the concentration constituting a so-called ansolvo acid, for example an aqueous solution essentially containing one molecular proportion of zinc chloride per less than seven molecular proportions of water, is used in the catalytic hydration of acetylene.

In our invention, we have discovered that a dilute aqueous solution of a salt of zinc or of cadmium in the concentration of less than 50 percent is an excellent catalyser for the hydration of acetylene at high pressure.

The remarkable advantages of our invention are based upon the use of a salt of zinc or of cadmium which is much cheaper than a mercury salt, and upon the achieved sufficient reaction velocity and high yield of pure acetaldehyde.

Salts of strong acids such as halide, sulfate and sulphonate give a pH of about 4.5 in dilute aqueous solution in a concentration of less than 50 weight percent (for example, one molecular proportion of zinc chloride per more than seven molecular proportions of water), so that it is not necessary to add acid to the said aqueous solution, but salts of weak acids such as acetate and naphthenate give a pH of more than 6.0 in such dilute aqueous solution, so that it is necessary to add a small quantity of an inorganic or organic acid to make the pH less than 6.0.

We have discovered that the concentration of acetaldehyde in the said solution does not go over about 10 percent and that acetaldehyde produced in the solution above such concentration turns into oily or tarry matter through crotonaldehyde or higher molecular unsaturated aldehydes. It therefore follows that, in order to avoid the above-mentioned oil or tar formation and to obtain acetaldehyde in good yield, the concentration of acetaldehyde in the aqueous catalyst solution should be maintained at less than 10 percent by stopping the reaction or replacing the solution with a new catalyst solution.

In one embodiment of the invention, an acidic aqueous solution of a salt of zinc or of cadmium is charged in an autoclave and acetylene gas is introduced thereinto, and the contents are shaken at a temperature of 130 to 230° C. and at a pressure of more than 10 atmospheres, the total pressure of the acetylene and water vapor generated from the said catalyst solution at the said temperature. Acetylene is thus converted to acetaldehyde by the hydration. When the acetaldehyde concentration in the aqueous catalyst solution approaches 10 percent, the contents of the autoclave are led to a distilling vessel, obtaining acetaldehyde free from high molecular aldehydes and recovering unreacted acetylene. The residual solution from the distillation is passed, if necessary, through a filter charged with active carbon or fuller's earth and, thus freed from impurities and then adjusted in its concentration, returned again to the autoclave, having substantially the initial activity.

In another embodiment of the invention, an acidic aqueous catalyst solution is charged in an autoclave and heated up to a temperature of 130 to 230° C. and acetylene gas is passed under pressure into the autoclave until the pressure in the autoclave is more than 10 atmospheres. At the said temperature and pressure, the said catalyst solution is withdrawn, maintaining the concentration of acetaldehyde in the solution in the autoclave at less than 10 percent, and the consumed acetylene is replaced by fresh acetylene. The solution leaving the autoclave is distilled and the liquor obtained by washing the vapor to separate unreacted acetylene is rectified; thus pure acetaldehyde freed from high molecular aldehydes is obtained. The residue, after purification and adjustment of the concentration, is circulated again. As impure gases in the acetylene gas used are gradually increased in the vapor phase in the autoclave, it is preferable to withdraw a small quantity of vapor from the autoclave at intervals.

The reaction velocity in an aqueous solution of a salt is a function of its concentration, reaction temperature and reaction pressure. In our invention, the reaction is to be carried out at the temperature of 130 to 230° C., as the reaction velocity is too small at temperatures below 130° C., while the aldol condensation reaction is greatly accelerated at temperatures over 230° C. By our invention, as the secondary reaction is essentially suppressed as shown in the examples, which follow, very pure acetaldehyde is obtained by distilling the reaction solution, while the distillation residue can be used repeatedly as the catalyser in the following reaction. Thus, continuous operation can be readily practiced by our invention. Because of the inconsiderable secondary reaction and of the damped atmosphere in the autoclave caused by a dilute aqueous solution of catalyser, it is safe to use impure acetylene gas as well as pure acetylene gas and in high pressure without the danger of explosion.

Example 1

An aqueous solution of 29 g. of crystalline zinc sulfate dissolved in 180 g. of water is charged into a 1 liter autoclave and acetylene gas of 98 percent purity is introduced up to a pressure of 22 atmospheres at room temperature. The contents are heated to 140° C. and shaken for 4 hours at the said temperature. 0.125 mol of acetylene is absorbed in the solution and acetaldehyde is formed by the hydration of the acetylene. The solution is pale yellow and contains neither precipitate nor oily or tarry matter. Distilling the solution, 5.6 g. of acetaldehyde are obtained, that is a 99 percent yield based on the consumed acetylene. Acetic acid as a by-product is less than 0.5 percent in amount. Halide, sulfate or sulphonate of zinc or of cadmium can also be used. Of these, the chloride gives about twice the reaction velocity at the same molecular concentration as do the other salts.

Example 2

An aqueous solution of 11 g. of crystalline zinc acetate dissolved in 180 g. of water and 3 g. of acetic acid is charged into a 1 liter autoclave and acetylene gas of 98 percent purity is introduced up to a pressure of 17 atmospheres at room temperature. The contents are heated to 140° C. and shaken for 2 hours at the said temperature. 0.121 mol of acetylene is converted into acetaldehyde. Distilling the solution, 3.7 g. of pure acetaldehyde are obtained, that is, a 76 percent yield based on the consumed acetylene. If acetic acid is not added to the catalyst solution, a very small amount of acetaldehyde is produced while high molecular unsaturated aldehydes are produced in large quantity, and the latter are gradually changed into oily or tarry matter as the reaction time is extended. Any salt of zinc or cadmium with weak acid other than zinc acetate in this example gives also a substantially similar result.

Example 3

500 cc. of a 23 percent by weight aqueous solution of zinc chloride is charged in a 1 liter internal-agitating type autoclave, which is then heated to 150° C. Acetylene gas of 98 percent purity is compressed into the autoclave to make the inner pressure 30 kg. per square centimeter. At the said temperature and while agitating the solution, the said catalyst solution is removed at a velocity of flow of 4 liters per hour and new acetylene gas is supplied so as to maintain the said pressure. The solution leaving the autoclave contains acetaldehyde in the concentration of about 1 per cent by weight and after distilling the solution pure acetaldehyde is obtained in a yield of 96.9 percent based on the consumed acetylene. The reaction velocity is 2 mols of acetylene per hour per liter of catalyst solution. The distillation residue, after purification and adjusting of its concentration, is returned to the autoclave.

Having described our invention as related to various embodiments of the same, it is our intention that the invention be not limited by any of the details of description unless otherwise specified, but rather be construed broadly within its spirit and scope as set out in the accompanying claims.

We claim:

1. A method of producing acetaldehyde from acetylene, in the liquid phase, which comprises heating, at a temperature of 130–230° C. and at a pressure of more than 10 atmospheres, acetylene gas with an aqueous solution of, as catalyst, a catalytically effective quantity of a salt selected from the group consisting of halides, sulfates, acetates, sulphonates and naphthenates of zinc and of cadmium, at a pH of less than 6.0, the concentration of the said salt in the solution being less than 50%; thereafter distilling the solution while maintaining the concentration of acetaldehyde therein at less than 10%; and returning the residual solution from the distillation, after purification and adjustment of the concentration, for re-use as catalytic solution.

2. The method of producing acetaldehyde from acetylene, in the liquid phase, which comprises heating, at a temperature of 130–230° C. and at a pressure of more than 10 atmospheres, acetylene gas with an aqueous solution of, as catalyst, a catalytically effective quantity of zinc sulfate, at a pH of less than 6.0, the concentration of the zinc sulfate in the solution being less than 50%; thereafter distilling the solution while maintaining the concentration of acetaldehyde therein at less than 10%; and returning the residual solution from the distillation, after purification and adjustment of the concentration, for re-use as catalytic solution.

3. The method of producing acetaldehyde from acetylene, in the liquid phase, which comprises heating, at a temperature of 130–230° C. and at a pressure of more than 10 atmospheres, acetylene gas with an aqueous solution of, as catalyst, a catalytically effective quantity of zinc acetate, said solution containing sufficient added acetic acid to maintain the pH at less than 6.0, the concentration of the zinc acetate in the solution being less than 50%; thereafter distilling the solution while maintaining the concentration of acetaldehyde therein at less than 10%; and returning the residual solution from the distillation, after purification and adjustment of the concentration, for re-use as catalytic solution.

4. The method of producing acetaldehyde from acetylene, in the liquid phase, which comprises heating, at a temperature of 130–230° C. and at a pressure of more than 10 atmospheres, acetylene gas with an aqueous solution of, at catalyst, a catalytically effective quantity of zinc chloride at a pH of less than 6.0, the concentration of the zinc chloride in the solution being less than 50%; thereafter distilling the solution while maintaining the concentration of acetaldehyde therein at less than 10%; and returning the residual solution from the distillation, after purification and adjustment of the concentration, for re-use as catalytic solution.

References Cited in the file of this patent

UNITED STATES PATENTS

| | | |
|---|---|---|
| 2,077,586 | Rosinsky et al. | Apr. 20, 1937 |

FOREIGN PATENTS

| | | |
|---|---|---|
| 393,690 | Great Britain | June 15, 1933 |